June 10, 1969    Q. E. WONN    3,448,767

TRANSMISSION CONTROL

Filed April 3, 1967

INVENTOR.
Quinby E. Wonn
BY
Ronald L. Phillips
ATTORNEY

United States Patent Office 3,448,767
Patented June 10, 1969

3,448,767
TRANSMISSION CONTROL
Quinby E. Wonn, Plymouth, Mich., assignor to General Motors Corporation, Detroit, Mich., a corporation of Delaware
Filed Apr. 3, 1967, Ser. No. 628,110
Int. Cl. B60k 23/04
U.S. Cl. 137—595                          12 Claims

ABSTRACT OF THE DISCLOSURE

A transmission control is provided having linkage including a pneumatic link for applying to a control valve in an automatic transmission a force which is substantially proportional to engine throttle opening and decreases with decreasing atmospheric pressure to provide a modulated pressure in the transmission control system for conditioning the drives in accordance with engine throttle opening and atmospheric pressure.

Figure 1:
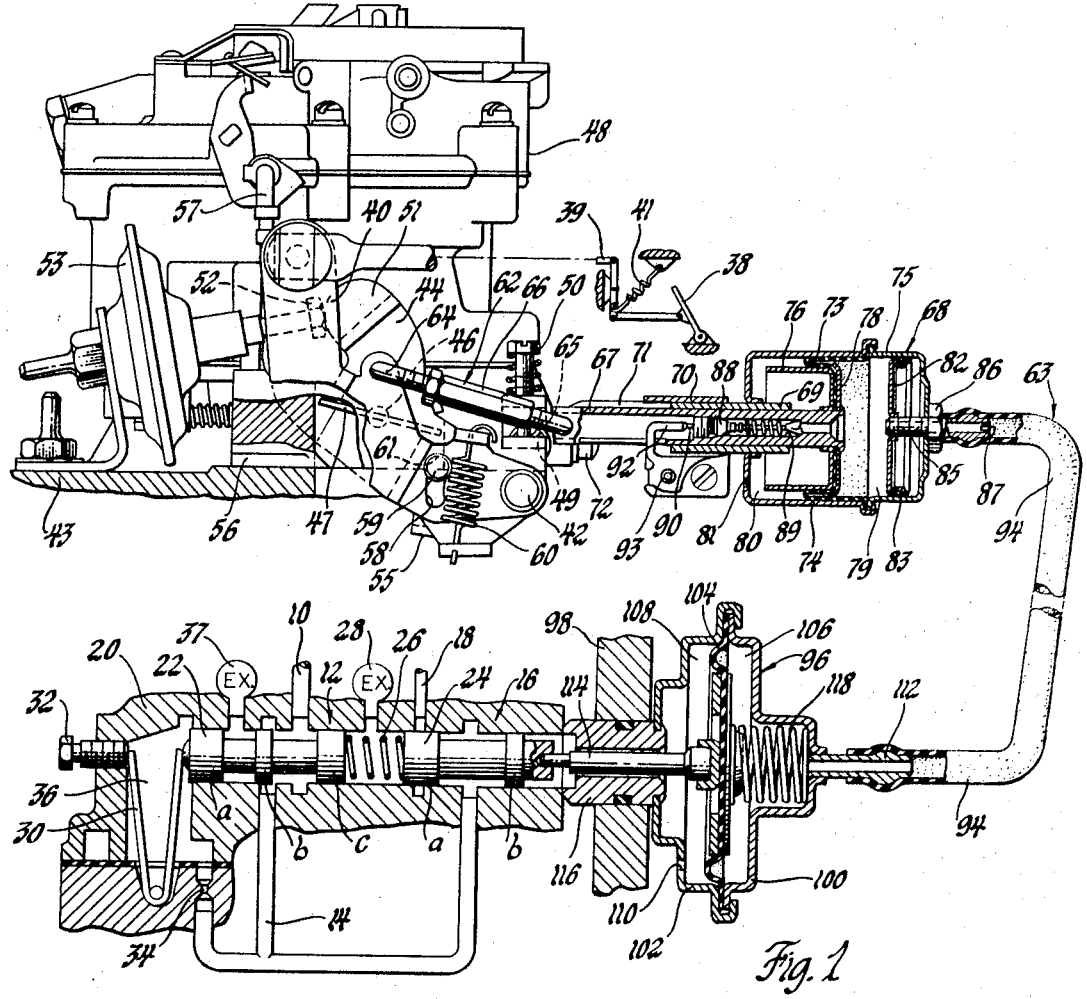

This invention relates to a transmission control and more particularly to a pneumatic transmission control for an automatic transmission control system providing a transmission control pressure modulated in accordance with engine throttle opening and atmospheric pressure.

A transmission control constructed according to the present invention as illustrated in the preferred embodiment comprises linkage connecting the engine throttle actuator to the engine throttle valve and the detent valve and TV valve in an automatic transmission control system. Movement of the engine throttle actuator is converted by mechanical linkage into opening of the engine throttle and also displacement of a pneumatic link which is connected to apply a force to the detent valve and TV valve. Between the engine throttle idle position and the full open position the relationship between pneumatic link displacement and engine throttle opening provided by the mechanical linkage is determined so that the force applied by the pneumatic link to the TV valve is at least substantially proportional to engine throttle opening and engine throttle actuator movement. The TV valve provides a regulated pressure (TV pressure) and with the biasing control force thus provided, the TV pressure is made substantially proportional to engine throttle opening for controlling transmission shifts.

At the full open throttle position the mechanical linkage permits overtravel (through detent travel) of the engine throttle acuator and also changes the relationship between engine throttle actuator movement and pneumatic link displacement so that the valve biasing force applied by the pneumatic link increases at a faster rate with engine throttle actuator movement during the through detent travel. The force applied to the TV valve and the detent valve during the through detent travel provides increased TV pressure which remains substantially proportional to engine throttle actuator movement. The increased force is also sufficient to move the detent valve to its open position connecting TV pressure to a detent line to provide in the transmission control system a control pressure (detent pressure) for establishing forced transmission downshifts.

In the pneumatic link there is provided a check valve which is controlled to open only at the idle throttle position to charge the pneumatic link with atmospheric pressure. With the pneumatic link thus charged, the biasing force applied to the transmission control valves by the pneumatic link decreases with decreasing atmospheric pressure such as occurs with increasing altitude so that TV pressure is modulated in accordance with altitude. Thus, the normal range of TV pressure is maintained for a given engine torque demand irrespective of the varying atmospheric pressure encountered upon changes in altitude.

An object of the present invention is to provide a transmission control including a pneumatic link producing a transmission control biasing force which is substantially proportional to engine throttle valve opening.

Another object is to provide linkage including a pneumatic link for applying to an automatic transmission control valve a force which increases with increasing throttle valve opening and decreases with decreasing atmospheric pressure.

Another object is to provide linkage for connecting an engine throttle actuator to both an engine throttle valve and a transmission control valve system operable to open the engine throttle valve while applying to the transmission control valve system a force which increases at a predetermined rate with increasing throttle valve opening up to full open throttle and shifts to a faster rate upon throttle actuator overtravel.

Another object is to provide linkage connecting an engine throttle actuator to both an engine throttle valve and a transmission TV valve and detent valve and including a pneumatic link applying to the detent valve and TV valve a force which increases with increasing engine throttle opening to provide a TV pressure substantially proportional to engine throttle opening with the biasing force increasing at a faster rate during throttle actuator overtravel to open the detent valve, the pneumatic link including a recharging valve which recharges the pneumatic link with atmospheric pressure at the idle throttle position so that the biasing force acting on the transmission control valves decreases with increasing altitude to provide altitude compensation.

These and other objects of the present invention will be more apparent from the following description and drawing in which:

FIGURE 1 shows a portion of a transmission control system of an automatic transmission having a TV valve and detent valve controlled by a pneumatic transmission control embodying features of the present invention with parts of the pneumatic control shown in section.

Figure 2:
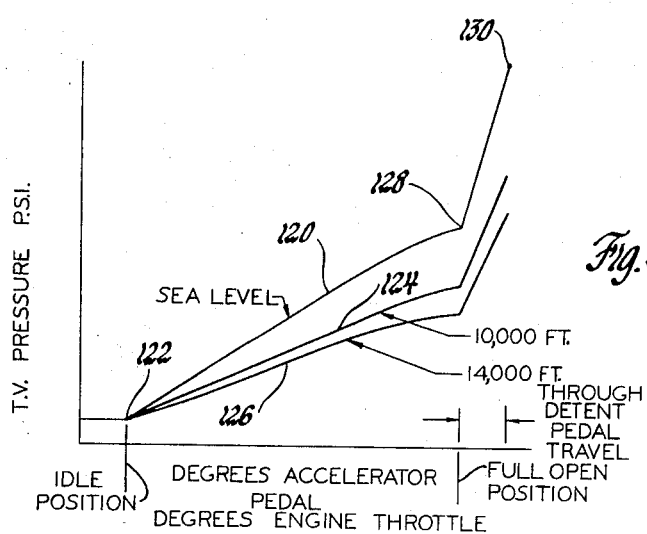

FIGURE 2 graphically illustrates typical performance characteristics of the transmission control with TV pressure plotted against engine throttle valve opening and accelerator pedal movement.

The portion of the automatic transmission control system shown in FIGURE 1 includes a main line 10 containing a regulated pressure which is delivered via various conventional transmission control valves, not shown, to the drive engaging devices of a transmission to establish the different speed ratio drives to drive a vehicle. The main line 10 is shown connected to a TV valve 12 which establishes a downstream regulated pressure (TV pressure) in a TV line 14. The TV pressure in line 14 is supplied to the control system's one or more shift valves (not shown), the TV pressure and a governor pressure reflective of vehicle speed acting on the one or more shift valves to automatically control the shifts in the transmission. The TV pressure is a controlled regulated pressure which is made reflective of torque load on the engine and is corrected for changes in atmospheric pressure such as are experienced with altitude change by the pneumatic transmission control of the present invention as described in detail later. The transmission control system also includes a detent valve 16 which under certain conditions as described in detail later connects the TV line 14 to a detent line 18 which is connected to the one or more shift valves to provide forced downshifts.

The TV valve 12 and detent valve 16 share a valve housing 20 having a bore in which is slidably mounted the TV spool valve element 22 having land a, b and c and the detent spool valve element 24 having lands a and b. A coil spring 26 is mounted in the bore between the valve elements 22 and 24 and there is provided an exhaust port 28 for exhausting this spring chamber. A positioner spring 30 acts rightwardly on the TV valve element 22. Spring 30 is adjusted by a screw 32 to position element 22 as shown when there is no main line pressure.

The TV valve 12 is operable to regulate the pressure in TV line 14 in a conventional manner with the detent valve element 24 providing reaction for spring 26. The fluid pressure from main line 10 is delivered between lands b and c to TV line 14. Fluid in TV line 14 is delivered via an orifice 34 to a chamber 36 where it acts to urge valve element 22 rightwardly against spring 26 to exhaust TV line 14 between lands a and b to an exhaust port 37. Assuming that the biasing force provided by spring 26 remains constant the valve element 22 will continue to reciprocate in the foregoing manner to maintain a constant regulated TV pressure in the TV line 14 with the regulated TV pressure valve being determined solely by the biasing effect of spring 26. When the spring force of spring 26 is increased by leftward movement of the detent valve element 24 the TV valve 12 regulates at proportionally higher pressures. The maximum and minimum regulated TV pressure will be predetermined for a particular vehicle-engine-transmission combination and may be anything reasonably desired.

The detent valve 16 blocks the TV line 14 from the detent line 18 in the closed portion shown. Assuming that there is provided a sufficient leftward force on the detent valve element 24 as described in greater detail later the detent valve 16 will be moved to its open position connecting the TV line 14 between lands a and b to the detent line 18.

The pneumatic transmission control according to the present invention and demonstrated as controlling the TV valve 12 and detent valve 16 is provided by the linkage now to be described. The linkage comprises an accelerator pedal 38 which is connected by accelerator rod linkage 39 to pull an accelerator overtravel lever 40. A return spring 41 is connected as shown to the accelerator rod linkage 39 so that linkage 39 is biased to push on both the pedal 38 and lever 40. The accelerator overtravel lever 40 is pivotally connected by pivot pin 42 to a throttle lever 44. Throttle lever 44 is connected to a throttle shaft 46 which operates the throttle valve 47 of a conventional carburetor generally designated at 48 mounted on the engine's intake manifold 43. The throttle lever 44 has a flange 49 engageable with the end of an idle adjustment screw 50 threaded to the carburetor housing to determine the engine throttle valve's fixed idle setting. The throttle lever 44 also has a second flange 51 engageable with the plunger 52 of a dashpot generally designated at 53 which is bolted to the intake manifold. The dashpot 53 is a conventional structure and operates to prevent the engine throttle from closing too rapidly and stalling the engine as in the conventional manner. An arm 55 secured to the throttle shaft 46 is engageable with a stop flange 56 provided on the carburetor housing to determine the full open throttle position. Rod 57 connects the accelerator lever 44 to operate the carburetor's accelerator pump in the conventional manner.

The levers 40 and 44 have a lost motion connection provided by an arcuate slot 58 in lever 40 which slot receives a pin 59 secured to lever 44, the arcuate slot having side wall radii extending from the center of pivot pin 42. A detent spring 60 connected at one end to lever 40 and at the other end to lever 44 biasses the upper end 61 of slot 58 toward pin 59 with the pivotal movement of the levers occurring about pivot pin 42.

A transmitting link 62 connects the overtravel lever 40 to a pneumatic link generally designated as 63. The link 62 comprises a pair of threaded rods 64 and 65 which are connected by an internally threaded collar 66 so that the length of the link is adjustable. The rod 64 is pivotally connected to the overtravel lever 40 and the rod 65 is pivotally connected to the piston rod 67 of a pneumatic pump 68 which provides the transmitter of the pneumatic link 63.

The transmitter unit 68 is mounted on the carburetor by a hollow, cylindrical sleeve 69 which is clamped by a bracket 70 to a support arm 71, arm 71 being secured by a screw 72 to the carburetor housing. The piston rod 67 extends through and is supported by the sleeve 69 for reciprocal movement. The transmitter unit 68 further comprises a rolling type diaphragm 73 whose periphery is clamped between the connected flanges of cup-shaped members 74 and 75 which provide the housing of the transmitter unit, the sleeve 69 extending through the left end of member 74 and being secured thereto. Diaphragm 73 is connected at its center by a piston 76 and a diaphragm protector 78 to the projecting end of piston rod 67, the piston having a small enough diameter to leave sufficient clearance for the rolling action of the diaphragm. The diaphragm 73 divides the transmitter housing into separate chambers 79 and 80. The chamber 80 is open to the atmosphere via an aperture 81 in the left end of cup member 74. The right end wall of chamber 79 is provided by a circular member 82 whose periphery is flanged to receive an O-ring seal 83 which engages the internal diameter of cup member 75 to seal the chamber 79. A hollow stem 85 is secured in the central aperture of member 82 and has external threads engaging the internal threads of a nut 86 secured in an aperture in the right end of cup member 75. The nipple end of stem 85 is provided with a slot 87 for receiving a tool such as a screwdriver to turn the stem 85 and by virtue of its threaded connection with the transmitter housing advance or retract the housing wall member 82 to adjust the volume of chamber 79 and thus of the pneumatic link for reasons which will become more apparent later.

A check valve 88 such as the conventional tire valve shown is mounted in a central passage 89 in the piston rod 67 which is for connecting the chamber 79 with the atmosphere. The operating stem 90 of check valve 88 is engageable with a valve operator 92 secured by the bracket clamping screws 93 to the bracket 70, the operator 92 being positioned to open the check valve when the carburetor throttle valve is in its idle position.

The transmitter pressure chamber 79 is connected by a hose 94 to the pnuematic link's receiver unit 96. The receiver is mounted on the transmission housing generally designated as 98 which houses the transmission's drive unit and control system. The receiver unit 96 comprises two cup-shaped members 100 and 102 and a diaphragm 104 whose periphery is clamped between the connected flanges of the cup members 100 and 102 which provide the housing of the receiver. The diaphragm 104 divides the housing into two chambers 106 and 108. The chamber 108 is open to atmosphere via an aperture 110 provided in member 102 and the chamber 106 is connected by the hollow nipple 112 to the hose 94. The diaphragm 104 is secured at its center by a sandwiching plate and cup assembly to a piston rod 114 which extends through a sleeve 116 connecting the receiver housing to the transmission housing. The left end of rod 114 is received in a blind bore in the right end of the detent valve element 24. A spring 118 mounted in the pressure chamber 106 between the rigid central portion of the diaphragm assembly and the right end of cup member 100 acts on piston rod 114 to normally hold the detent valve 24 in the position shown to provide reaction for the spring 26.

Describing now the operation of the pneumatic transmission control, prior to depression of the accelerator pedal 38 all of the linkages are in the positions shown in FIGURE 1 with the return spring 41 acting on the linkage 39 to exert a push on both the accelerator pedal and the overtravel lever 40. The detent spring 60 holds the upper slot end 61 and pin 59 of the lost motion connection in engagement and since the levers 40 and 44 are also connected by the pivot pin 42, the throttle lever 44 is held against the idle adjustment stop 50. The check valve 88 is held open by the operator 92 at the idle position so that the transmitter chamber 79 is charged with atmospheric pressure. Assuming that the engine is operating with the carburetor at the idle throttle setting, regulated main line pressure exists in main line 10 and with the spring 118 in the pneumatic receiver holding the detent valve element 24 in the position shown to provide reaction for the spring 26, the TV valve 12 establishes the minimum TV pressure in TV line 14.

Referring to FIGURE 2 there is shown typical characteristics of the pneumatic transmission control at various altitudes. The curve 120 depicts the characteristics of the control provided when the vehicle is operating at sea level. Assuming for the moment that the vehicle is operating at sea level the minimum TV pressure which occurs at the idle throttle position is indicated at point 122 on the curve 120 which will also be the minimum TV pressure provided, for example, at 10,000 feet above sea level and 14,000 feet above sea level as indicated by the curves 124 and 126, respectively.

Assuming the vehicle remains at sea level, when the accelerator pedal is depressed the accelerator rod linkage 39 pulls on the accelerator overtravel lever 40. The detent spring 60 provides sufficient bias to prevent relative angular movement between the lever 40 and the throttle lever 44 and thus the levers 40 and 44 pivot clockwise conjointly about the axis of the throttle shaft 46 with the movement of the throttle lever opening the throttle valve 47. Initial clockwise pivoting movement of the accelerator overtravel lever 40 brings the check valve stem 90 of the check valve 88 out of engagement with the operator 92 to close the pneumatic link to the atmosphere. The movement imparted to the transmitter piston 76 by lever 40 and link 62 as the accelerator pedal is depressed decreases the volume of chamber 79 and thus increases the pressure of the entrapped air in the pneumatic link. The air pressure is received by the receiver unit 96 of the pneumatic link where it is applied by the receiver piston 114 to act on the detent valve element 24 urging it leftwardly to increase the bias on the TV valve and thereby increase TV pressure.

It is desirable from the standpoint of easily calibrating the shifts in the transmission that the TV pressure be proportional to engine throttle opening between idle and full open throttle. The thermodynamic process that occurs during compression in the pneumatic link is essentially an isothermal process resulting in the product of the pneumatic link's air pressure and volume being a constant whereby if air pressure were plotted against air volume a parabolic curve would result.

The linkage provided for converting the pivotal movement of the accelerator overtravel lever 40 about the axis of throttle shaft 46 into linear movement of the transmitter piston 76 is determined so that the pressure in the pneumatic link and thus the pneumatic link output force transmitted to act on the TV valve and therefore the TV pressure is at least closely proportional to engine throttle opening and the corresponding accelerator pedal position. This is effected in part by reducing the total pneumatic link volume by only a small percentage in providing the desired pneumatic link output force so that a portion of the parabolic curve describing the air pressure-air volume relationship is used in which the air pressure is closely proportional to air volume. In addition to determining the total amount of displacement as described above the mechanical linkage also provides a geometrical relationship between the lever 40 and the transmitter piston 76 so that the ratio of the change in engine throttle opening to change in transmitter piston stroke and accordingly pneumatic link displacement is lowest at or near idle and gradually increases with throttle opening to further compensate for the isothermal process. The desired change in the rotary-linear relationship of lever 40 and piston 76 is accomplished in the preferred embodiment by connecting rod 64 of the transmitter link 62 to lever 40 at a point on a vertical line extending through the axis of the throttle shaft 46 when lever 40 is in the position shown and locating the path of movement of transmitter piston rod 67 and connected piston 76 perpendicular to such vertical line.

Thus, clockwise pivotal movement of lever 40 about the axis of throttle shaft 46 will be converted into linear movement of the transmitter piston 76 with the amount of linear piston movement gradually decreasing sinusoidally for the same increments of angular movement of lever 40 as the latter is pivoted from the position shown corresponding to the throttle idle position to a position corresponding to full open throttle, the radius of the point of connection of lever 40 to link 62 from the axis of the throttle shaft 46 determining the piston stroke. The effect of the isothermal compression process is closely compensated for by the relationships thus provided as shown by the curve 120 at sea level with the pneumatic link output force producing a TV pressure substantially proportional to throttle opening between the idle and full open positions. The TV pressure that occurs at full open throttle is indicated at 128 on curve 120. It will be appreciated that such linkage may be modified by those skilled in the art to provide a closer correlation therebetween.

Assuming that the vehicle remains at sea level and the operator depresses the accelerator pedal for a forced downshift, the throttle stop arm 55 hits the stationary stop 56 to prevent movement of the engine throttle valve past its full open position. Upon continuing depression of the accelerator pedal the detent spring 60 yields to permit the accelerator overtravel lever 40 to then pivot on the then stationary throttle lever 44 clockwise about the pivot pin 42 with such pivotal movement being permitted by the lost motion connection 58-59. The connection of the transmitter link rod 64 to the lever 40 is at a considerably larger raduis from the pivot pin 42 than its radius from the axis of the throttle shaft 46 and thus the ratio of change in pivot movement of lever 40 to change in linear movement of transmitter piston 76 has been greatly increased. This change in the rotary-linear relationship of lever 40 and transmitter piston 76 is provided so that the air pressure in the pneumatic link will be increased at a much faster rate during the through detent travel as shown by curve 120 between points 128 and 130 to provide a sufficient pneumatic link output force to move the detent valve element 24 to its open position connecting the TV line 14 to the detent line 18 to provide for forced downshifts in the transmission. The rotary-linear motion relationship is similar to that provided in the idle-full open throttle range in that the TV pressure remains substantially proportional to accelerator pedal position during the through detent travel.

The operation thus far described has assumed that there has been no atmospheric pressure change such as occurs, for example, when the vehicle ascends to a high altitude. In the event the vehicle so ascends the operator in the operation of the vehicle will be cycling the accelerator pedal. Each time the accelerator pedal assumes the idle position shown, the check valve operator 92 opens the check valve 88 to charge the pneumatic link with atmospheric air. The less dense air which is admitted produces correspondingly lower pneumatic link output forces and correspondingly lower TV pressures while TV pressure is maintained substantially proportional to engine throttle and accelerator position past idle. For example, the TV pressure at 10,000 feet as indicated by the curve 124 will be lower than that at sea level and the TV pressure at 14,000 feet as indicated by the curve 126 will be lower than that at 10,000 feet from idle through detent, the decreased atmospheric pressure decreasing the slope of the TV pressure curve. Thus, the TV pressure is maintained at a normal range of pressure for a given engine torque irrespective of atmosphere pressure changes such as occur with changes in altitude. Without altitude compensation and if the TV pressure was the same at any given throttle opening, optimum shifts in the transmission will not be achieved since the volumetric efficiency of the internal combustion engine decreases with decreasing atmospheric pressure and increased throttle opening is required to provide the same engine torque which was obtained at a smaller throttle opening at a lower altitude. Thus, with the pneumatic transmission control of the present invention the changes in the torque demand on the engine are sensed by the charges of atmospheric pressure to the pneumatic link which influences the transmission control to alter the TV pressure so that it will remain indicative of the actual engine torque demand.

In addition to the above features the flexibility of the pneumatic link connecting the transmitter and receiver provides a linkage which is readily suitable in applications where the transmission is remotely located from the engine. Furthermore, when the accelerator pedal is released by the operator and the throttle lever 44 is biased by the return spring 41 to the idle position, the return movement of the transmitter piston 76 produces a slight vacuum that impedes engine throttle closing which is a desirable feature since the resultant dash pot effect can negate the need for a separate dash pot such as 53, the dash pot effect being provided to prevent the engine throttle from closing rapidly and stalling the engine. Other advantages of the pneumatic transmission control construction include the easy calibration thereof. For example, the check valve operator 92 can be adjusted so that the TV pressure is not increased by the pneumatic link until some predetermined throttle opening past the idle position. Furthermore, by turning the threaded stem 85 in the transmitter unit 68, the pneumatic link volume can be adjusted to vary the slope of the TV pressure curve.

The above-described preferred embodiment is illustrative of the present invention which may be modified within the scope of the appended claims.

I claim:

1. In combination, an engine throttle valve movable between an idle position and a full open position, a transmission pressure control valve operable in response to a pressure control force to provide a corresponding pressure and linkage means including a pneumatic link for applying to said control valve a pressure control force which is substantially proportional to engine throttle valve position throughout the range of engine throttle valve movement.

2. In combination, a throttle actuator, an engine throttle valve, a transmission regulator valve operable in response to a pressure control force to provide a corresponding pressure, and linkage means continuously operatively connecting said throttle actuator to both said valves for moving said engine throttle valve between an idle position and a full open position according to throttle actuator operation while applying to said transmission regulator valve throughout the range of engine throttle valve movement a pressure control force which is substantially proportional to engine throttle valve position and decreases with decreasing atmospheric pressure.

3. In combination, an engine throttle valve movable between an idle position and a full open position, a transmission pressure control valve operable in response to a pressure control force to provide a corresponding pressure and linkage means including a pneumatic link for applying to said control valve throughout the range of engine throttle valve movement a pressure control force which increases with increasing throttle valve opening and decreases with decreasing atmospheric pressure.

4. The combination set forth in claim 3 and said pneumatic link charged with atmospheric air.

5. The combination set forth in claim 3 and said pneumatic link having a valve operable to open said pneumatic link to the atmosphere only at a predetermined engine throttle valve position.

6. In combination, a throttle actuator, an engine throttle valve movable between an idle position and a full open position, a transmission control system having a TV valve determining a TV pressure, a pneumatic link operatively connected to apply a force to said TV valve when the volume of said pneumatic link is decreased and linkage means continuously operatively connecting said throttle actuator to both said engine throttle valve and said pneumatic link for moving said engine throttle valve from said idle position to said full open position with actuator operation while decreasing the volume of said pneumatic link according to a predetermined relationship with engine throttle valve opening from said idle position to said full open position to apply to said TV valve a pressure control force which is substantially proportional to engine throttle valve opening whereby TV pressure is substantially proportional to engine throttle valve opening.

7. The combination set forth in claim 6 and a valve operable to open said pneumatic link to the atmosphere at a predetermined engine throttle valve position so that the pneumatic link force applied to said TV valve decreases with decreasing atmospheric pressure whereby TV pressure decreases with decreasing atmospheric pressure.

8. The combination set forth in claim 7 and said pneumatic link provided by a transmitter connected by a hose to a receiver.

9. The combination set forth in claim 6 and said engine throttle valve pivotal about an axis, said pneumatic link including a transmitter having a piston supported for linear movement and said linkage means including a lever pivotal about said axis, a link connecting said piston to said lever at a point located a substantial distance from said axis.

10. The combination set forth in claim 9 and said pneumatic link having volume adjustment means for adjusting the volume of said pneumatic link to change the proportionality between the pneumatic link force and engine throttle valve opening.

11. In combination, a throttle actuator, an engine throttle valve moveable between an idle position and a full open position, a transmission control system having a TV valve determining a TV pressure and a detent valve moveable from a normally closed position to an open position to establish the delivery of TV pressure as a detent pressure, a first lever secured to said engine throttle valve and pivotal about an axis to position said engine throttle valve, a second lever pivotally connected to said first lever at a substantial distance from said axis, a lost motion connection connecting said levers to permit limited relative pivotal movement therebetween, stop means operable to prevent movement of said engine throttle valve past said full open position, a spring connected to bias said levers toward each other and cooperating with said lost motion connection to prevent relative pivotal movement between said lever prior to operation of said stop means whereby said second lever is pivotably about said axis, a pneumatic link operatively connected to apply a force to said TV valve and detent valve when the pneumatic link volume is decreased to move said detent valve and control TV pressure, said pneumatic link having a piston for changing its volume, a link connecting said piston to said second lever at a point located a short distance from said axis and a long distance from the pivotal connection of said levers and a link connecting said throttle actuator to said second lever at a point located a substantial distance from both said axis and the pivotal connection of said levers so that movement of said throttle actuator through an engine throttle opening range pivots both said levers about said axis with said first lever moving said engine throttle valve from said idle position to said full open position while said piston is moved by said second lever to decrease the pneumatic link volume so that TV pressure is substantially proportional to engine throttle valve position and said detent valve is maintained in said closed position, and upon movement of said engine throttle actuator through an overtravel range said second lever pivots about said first lever against the bias of said spring while said engine throttle valve is held in said full open position by said stop means to move said piston to further decrease the pneumatic link volume to provide a rapid rise in TV pressure and open said detent valve.

12. The combination set forth in claim 11 and said pneumatic link having a recharging valve operable to open said pneumatic link to the atmosphere only at said idle position so that said pneumatic link is always charged with atmospheric air and causes said TV pressure to decrease with decreasing atmospheric pressure while remaining proportional to engine throttle valve position.

References Cited
UNITED STATES PATENTS

| | | | |
|---|---|---|---|
| 2,599,214 | 6/1952 | Wemp | 74—868 |
| 3,142,999 | 8/1964 | Searles et al. | 74—868 |
| 3,324,738 | 6/1967 | Olsen et al. | 74—867 |
| 3,368,427 | 2/1968 | Johnston et al. | 74—867 |

ARTHUR T. McKEON, *Primary Examiner.*

U.S. Cl. X.R.

74—867; 251—57

PO-1050
(5/69)

UNITED STATES PATENT OFFICE
CERTIFICATE OF CORRECTION

Patent No. 3,448,767      Dated June 10, 1969

Inventor(s) Quinby E. Wonn

It is certified that error appears in the above-identified patent and that said Letters Patent are hereby corrected as shown below:

Column 3, line 21 "valve" should be -- value --; Column 3, line 30 "portion" should be -- position --. Column 6, line 58, "high" should be -- higher --. Column 8, line 58 "pivotably" should be -- pivotable --.

SIGNED AND
SEALED

SEP 30 1969

(SEAL)
Attest:

Edward M. Fletcher, Jr.
Attesting Officer

WILLIAM E. SCHUYLER, JR.
Commissioner of Patents